US012182080B2

(12) United States Patent
Hachem et al.

(10) Patent No.: US 12,182,080 B2
(45) Date of Patent: *Dec. 31, 2024

(54) CUSTOM DATA AGGREGATION AND INTEGRATION PROCESSING

(71) Applicant: NCR Voyix Corporation, Atlanta, GA (US)

(72) Inventors: Paul E Hachem, Cumming, GA (US); Thomas Edwards, Suwanee, GA (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/966,439

(22) Filed: Oct. 14, 2022

(65) Prior Publication Data

US 2023/0029544 A1 Feb. 2, 2023

Related U.S. Application Data

(63) Continuation of application No. 15/827,225, filed on Nov. 30, 2017, now Pat. No. 11,544,238.

(51) Int. Cl.
| | |
|---|---|
| *G06F 16/00* | (2019.01) |
| *G06F 16/21* | (2019.01) |
| *G06F 16/25* | (2019.01) |
| *G06Q 20/18* | (2012.01) |
| *G06Q 20/20* | (2012.01) |

(52) U.S. Cl.
CPC ......... *G06F 16/211* (2019.01); *G06F 16/254* (2019.01); *G06F 16/258* (2019.01); *G06Q 20/18* (2013.01); *G06Q 20/202* (2013.01)

(58) Field of Classification Search
CPC .... G06F 16/211; G06F 16/258; G06F 16/254; G06Q 20/18; G06Q 20/202
USPC ........................................................ 707/756
See application file for complete search history.

(56) References Cited

U.S. PATENT DOCUMENTS

| | | | |
|---|---|---|---|
| 7,647,237 B2 | 1/2010 | Malave et al. | |
| 10,296,967 B1* | 5/2019 | Guez | ............... G06F 16/90335 |
| 2002/0170782 A1 | 11/2002 | Millikan | |
| 2003/0120547 A1 | 6/2003 | Walter et al. | |
| 2003/0131144 A1* | 7/2003 | Weaver | ................... G06F 9/541 |
| | | | 715/236 |

(Continued)

OTHER PUBLICATIONS

"U.S. Appl. No. 15/827,225, Advisory Action mailed Jan. 14, 2021", 3 pgs.

(Continued)

*Primary Examiner* — Monica M Pyo
(74) *Attorney, Agent, or Firm* — Schwegman Lundberg & Woessner, P.A.

(57) ABSTRACT

Agents are configured to collect data from terminals and send the data in real time to a data integrator. The data integrator identifies the data types and processes custom aggregation on select ones of data types from the data. The data and the output of any aggregations are translated to a select output format and sent to one or more select resources for further processing. The data integrator determines when to send the data and the output from any aggregation in the select output format to the one more select resources based on a defined condition. In an embodiment, the data integrator sends the data and output from any aggregation in real time to at least one of the one or more select resources.

19 Claims, 5 Drawing Sheets

(56) References Cited

U.S. PATENT DOCUMENTS

| | | | |
|---|---|---|---|
| 2005/0240970 A1* | 10/2005 | Schwalb | H04N 7/18 725/74 |
| 2007/0150758 A1 | 6/2007 | Henderson et al. | |
| 2007/0286351 A1 | 12/2007 | Ethier et al. | |
| 2011/0296251 A1* | 12/2011 | Joy | G06F 11/302 714/47.1 |
| 2013/0303837 A1 | 11/2013 | Berka et al. | |
| 2014/0122412 A1 | 5/2014 | Bandekar et al. | |
| 2014/0213418 A1 | 7/2014 | Lewicki | |
| 2014/0316588 A1* | 10/2014 | Giera | F04B 49/065 700/282 |
| 2014/0372138 A1 | 12/2014 | Chari et al. | |
| 2015/0245288 A1 | 8/2015 | Park et al. | |
| 2017/0250968 A1 | 8/2017 | Licht et al. | |
| 2018/0219879 A1* | 8/2018 | Pierce | H04L 63/1416 |

OTHER PUBLICATIONS

"U.S. Appl. No. 15/827,225, Advisory Action mailed Oct. 8, 2021", 3 pgs.

"U.S. Appl. No. 15/827,225, Final Office Action mailed Apr. 14, 2022", 12 pgs.

"U.S. Appl. No. 15/827,225, Final Office Action mailed Jul. 19, 2021", 12 pgs.

"U.S. Appl. No. 15/827,225, Final Office Action mailed Nov. 5, 2020", 11 pgs.

"U.S. Appl. No. 15/827,225, Non Final Office Action mailed Mar. 1, 2021", 11 pgs.

"U.S. Appl. No. 15/827,225, Non Final Office Action mailed Apr. 30, 2020", 10 pgs.

"U.S. Appl. No. 15/827,225, Non Final Office Action mailed Oct. 28, 2021", 12 pgs.

"U.S. Appl. No. 15/827,225, Notice of Allowance mailed Aug. 22, 2022", 13 pgs.

"U.S. Appl. No. 15/827,225, Response filed Jan. 5, 2021 to Final Office Action mailed Nov. 5, 2020", 8 pgs.

"U.S. Appl. No. 15/827,225, Response filed Jan. 28, 2022 to Non Final Office Action mailed Oct. 28, 2021", 7 pgs.

"U.S. Appl. No. 15/827,225, Response filed Jun. 1, 2021 to Non Final Office Action mailed Mar. 1, 2021", 8 pgs.

"U.S. Appl. No. 15/827,225, Response filed Jun. 9, 2022 to Final Office Action mailed Apr. 14, 2022", 7 pgs.

"U.S. Appl. No. 15/827,225, Response filed Jul. 30, 2020 to Non Final Office Action mailed Apr. 30, 2020", 8 pgs.

"U.S. Appl. No. 15/827,225, Response filed Sep. 20, 2021 to Final Office Action mailed Jul. 19, 2021", 7 pgs.

\* cited by examiner

CUSTOM DATA AGGREGATION AND INTEGRATION PROCESSING

CROSS-REFERENCE TO RELATED APPLICATION

This application is a continuation of U.S. patent application Ser. No. 15/827,225, filed Nov. 30, 2017, which application and publication is incorporated herein by reference in its entirety.

BACKGROUND

Enterprises collect a variety of data about their business. Some of this data is collected in batch modes while much of the data is collected in real time. The sources for the data include enterprise-based devices, web devices, mobile devices, etc. Often, the data collected is processed for driving support and maintenance decisions, planning decisions, inventorying decisions, staffing decisions, interacting with customer decisions, and the like.

One problem associated with data consumption is that the enterprise is continually changing the manners in which the enterprise: wants to combine portions of the data; wants the data presented; and wants the timing of the data reported. Another problem is that the enterprise is regularly changing the software services that the enterprise wants to evaluate or to consume the data for decision making within the enterprise. Furthermore, the software services that evaluate or consume portions of the data are continually changing, being replaced, being updated, and being added to the enterprise environment.

In fact, data is plentiful within enterprise environments and in many ways too plentiful. However, information that is derived from the data and timely reporting of that information to the appropriate consuming service for enterprise decision making are largely inadequate or ineffective.

Each enterprise understands its data and knows how it wants to consume information derived from the data. However, available data interfaces and data services are not customized to any large degree to specific enterprises, which means enterprises are continually lobbying vendors for what is needed or switching to new vendors in the hopes that the new vendors provide a closer or better to solution for what the enterprises believes they need.

SUMMARY

In various embodiments, methods and a system are provided for custom data aggregation and integration processing are provided.

According to an embodiment, a method for custom data aggregation and integration processing is provided. Specially, data that is collected by a plurality of agents from a plurality of terminals is received in real time. A portion of the data is selectively aggregated into aggregated data and the aggregated data is translated into a target data format. The aggregated data is provided to a resource at a time when an evaluated condition evaluates to true.

DETAILED DESCRIPTION

Figure 1A:
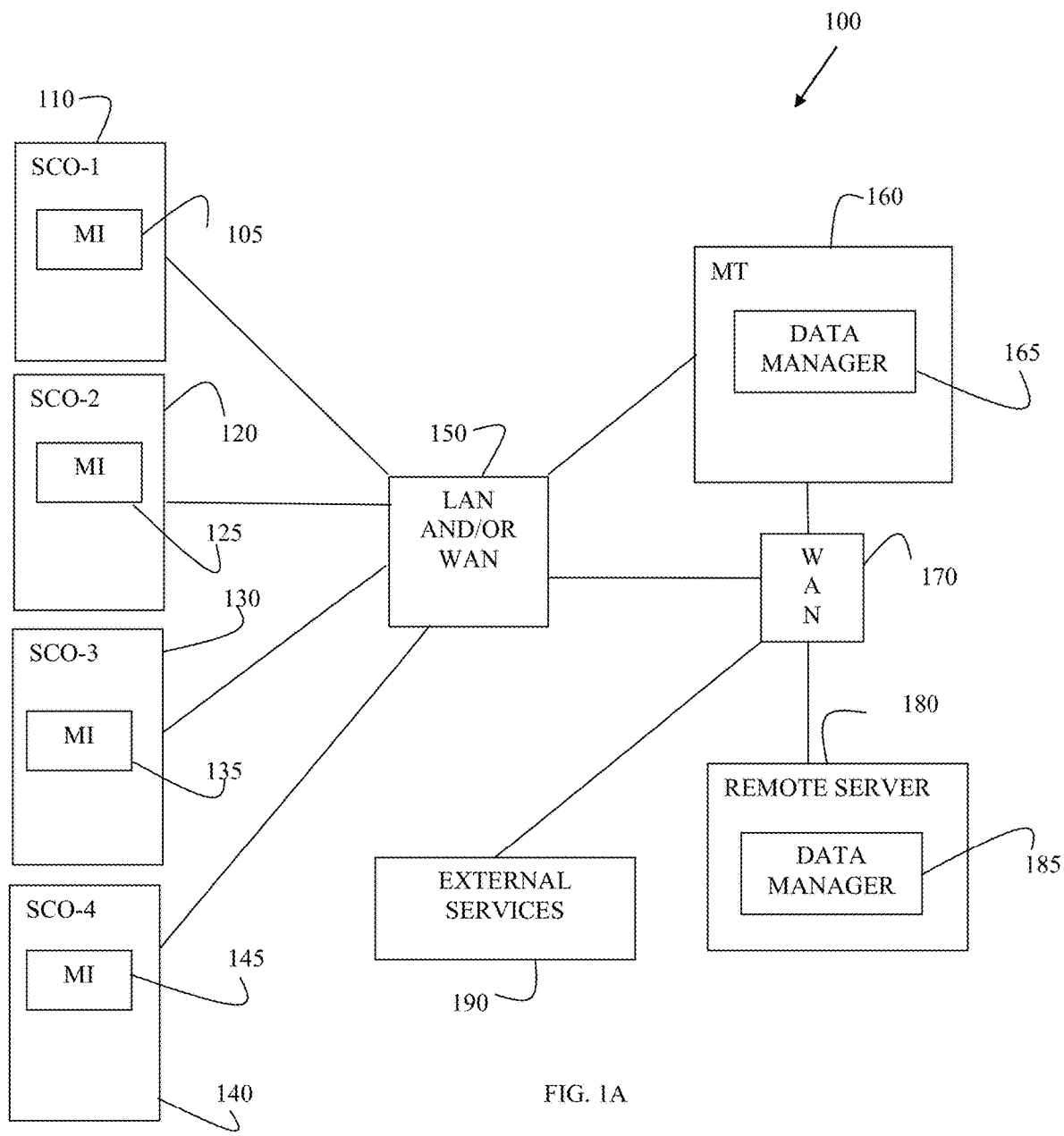
FIG. 1A is a diagram illustrating components of a custom data aggregation and integration processing system, according to an example embodiment.

FIG. 1A is a diagram illustrating components of a custom data aggregation and integration processing stem 100, according to an example embodiment. It is to be noted that the SST configuration management system 100 is shown schematically in greatly simplified form, with only those components relevant to understanding of the embodiments being illustrated.

Furthermore, the various components (that are identified in the FIG. 1A) are illustrated and the arrangement of the components is presented for purposes of illustration only. It is to be noted that other arrangements with more or less components are possible without departing from the teachings of custom data aggregation and integration processing, presented herein and below.

Furthermore, the techniques and the systems presented herein and below (for custom data aggregation and integration processing) may include all or some combination of the components shown with the system 100. The methods are programmed as executable instructions in memory and/or non-transitory computer-readable storage media and executed on one or more processors associated with the components/devices.

Specifically, the system 100 includes multiple SCO (Self-Checkout Service) terminals 110, 120, 130, and 140; a SS (Self-Service) management terminal 160, and a Local Area Network (LAN) and/or WAN 150. SCO terminals 110, 120, 130, and 140 include a management interface 105, 125, 135, and 145, respectively. The SS management terminal 160 includes a data manager 165. Optionally, the system 100 includes a Wide-Area Network (WAN) 170, a remote server 180 having an instance of the data manager 185, and/or one or more external services 190.

Initially, it is to be noted that a SCO terminal (110, 120, 130, or 140) is one type of Self-Service Terminal (SST), other types of SSTs that can be equally utilized with the teachings presented herein include, but are not limited to, an Automated Teller Machine (ATM), a digital sign, and a kiosk.

The management interfaces (105, 125, 135, and 145) are software agents that are executed as executable instructions from non-transitory memory or storage by processors of the SCO terminals (110, 120, 130, and 140). Each instance of the management interface (105, 125, 135, and 145) is responsible for communicating status, diagnostics, and transaction information to its assigned management terminal 160.

In an embodiment, the management interfaces (105, 125, 135, and 145) monitor logs of the SCO terminals (110, 120, 130, and 140) for events, transaction metrics, failures (in software, peripherals, SCO terminals, etc.), etc.

In an embodiment, the management interfaces (105, 125, 135, and 145) register and receive event information from the Operating System (OS) of the SCO terminals (110, 120, 130, and 140). The events can be related to transaction metrics, failures, etc.

In an embodiment, the management interfaces (105, 125, 135, and 145) are configured to receiving configuration and state information for their respective SCO terminals (110, 120, 130, and 140). This can include terminal status, mode of operation, health, intervention noted of the terminals (110, 120, 130, and 140), and sales transaction information.

In an embodiment, the transaction software executing on the terminals (110, 120, 130, and 140) is modified to record information in a log, such as an eXtensbile Markup Language (XML) file on the terminals (110, 120, 130, and 140), which is accessible and read in real time by the management interfaces (105, 125, 135, and 145).

In an embodiment, the management interfaces (105, 125, 135, and 145) are configured to monitor output produced by transaction software that executes on the SCO terminals (110, 120, 130, and 140), such as through monitoring of communication ports being used by the transaction software to report output.

The management interfaces (105, 125, 135, and 145) also are configured to access the LAN and/or WAN 150 and report in real time the collected events, metrics, health, intervention, and sales information.

In an embodiment, the management interfaces (105, 125, 135, and 145) can be custom-configured through an XML file that defines the types of data and format of data that the management interfaces (105, 125, 135, and 145) report in real time over the LAN and/or WAN 150 to the data manager 165 of the management terminal 160.

In an embodiment, the management interfaces (105, 125, 135, and 145) report the collected events, metrics, health, intervention, and sales information through the LAN 150 (when 150 is a LAN) over a WAN 170 to the data manager 185 of the remote server 180.

The real-time collected events, metrics, health, intervention, and sales information is reported in real time over network connections (150 and/or 170) to at least one instance of the data manager 165 and/or 185.

It is to be noted that each of the above-mentioned embodiments are not intended to be mutually exclusive from one another, such that one instance of the management interface, such as 110, can process a different embodiment from that which is processed by another instance of the management interface, such as 120.

The SS management terminal 160 may include real-time management software that permits an operator to view transactions taking place on the SCO terminals (110, 120, 130, and/or 140). The SS management terminal 160 may also include reporting software that reports information received from the management interfaces (105, 125, 135, and 145).

The SS management terminal 160 includes the data manager 165. Alternatively, the SS management terminal 160 includes an agent that forwards the real-time received terminal events, metrics, health, intervention, and sales information over the WAN 170 to a remote processing instance of the data manager 185 on the remote server 180.

The data manager (165 and 185) is configured to process the received terminal events, metrics, health, intervention, and sales information in custom-defined manners defined by a particular enterprise. This configuration information can be read in real time from a schema.

The schema defines a variety of information, such as data type and format, aggregation algorithms for processing against defined data types, output data types, output data format for any output produced by a specific aggregation algorithm, resource identifier for a resource that the data associated with the output data types and aggregation outputs are to be sent, and a timing attribute indicating when the resource is to receive the data and aggregation outputs. The schema may also include custom threshold values for specific aggregation outputs that alter the timing attribute to a threshold-based reporting approach. It is also noted that multiple resources may receive the data and aggregation outputs through a list of resource identifiers. In an embodiment, the output format may be identified in the specification as a reference to a custom-plugin that converts the data and aggregation outputs into a needed format for the resource that the data and aggregation outputs are to be sent from the data manager (165 and 185).

The aggregation algorithms can be custom-defined to work on a specific data type or on a set of data types. In an embodiment, at least one aggregation algorithm provides a counting mechanism that counts events, metrics, health, intervention, and sales information over a configured time period.

The enterprise associated with the SCO terminals (110, 120, 130, and 140) may access a user interface to the management terminal 160 to define the data types, any plugins, any specific aggregation algorithms, timing conditions, receiving resource identifiers, and threshold values. The user interface includes a backend processing component that automatically generates the schema. The data manager (165 and 185) processes the schema dynamically to self-configure and initiate itself for receiving the events, metrics, health, intervention, and sales information from the SCO terminals (110, 120, 130, and 140), performing the custom data aggregations, threshold condition comparisons, custom timing of reporting, and reporting in specific formats to specific resources.

It is noted that the schema-based approach is but one approach that can be taken and is not intended to limit aspects of the invention presented herein for custom data aggregation and integration processing.

A "resource" can be: 1) a remote software service, such as one of the external services 190; 2) a local software service (local within the LAN 150 environment) or remote software service (remotely accessible over a WAN 150); 3) an email address (a specific user or group of users), 4) a phone number (for texting or paging), 5) a storage location (file, directory, etc.), and 6) any other entity that can house or process the data and aggregation outputs reported by the data manager (165 and 185).

In an embodiment, the real time events, metrics, health, intervention, and sales information received from the SCO terminals (110, 120, 130, and 140) and/or the aggregation outputs can also be streamed in real time from the data manager (165 and 185) to resources.

In an embodiment, the resource is a dashboard service that processes on the management terminal 160.

In an embodiment, the health information includes heartbeats, mode of operation, and processing state change information for the SCO terminals (110, 120, 130, and 140).

In an embodiment, the events, metrics, health, intervention, and sales information can be processed in different manners producing different data and aggregation outputs for different resources by the data manager (165 and 185). In this way a single source of input data collected by the data manager (165 and 185) from a plurality of management interfaces (105, 125, 135, and 145) can result in different data and aggregation outputs sent to multiple different resources.

In an embodiment, the events, metrics, health, intervention, and sales information can be processed in a same manner producing the data and aggregation outputs for multiple different resources by the data manager (165 and 185).

In an embodiment, one or more of the SCO terminals (110, 120, 130, and 140) capable in operating in a Self-Service (SS) mode during which a customer performs a self-checkout and an assisted-checkout mode during which a cashier assisted the customer in checking out. In this manner, the SCO terminals (110, 120, 130, and 140) can be Point-Of-Sale (POS) terminals or SSTs depending upon their mode of operation. The mode of operation is also provided by the management interfaces (105, 125, 135, and 145) to the data manager (165 and 185) as part of the health information.

It is to be noted that the terminals (110, 120, 130, and 140) can be all or some combination of mobile-based terminals that execute a Self-Service Checkout Application to perform transactions. In such a case, the terminals (110, 120, 130, and 140) can communication with the data manager (165 and 185) over a LAN 150 or a WAN 150, using Wi-Fi and/or cellular communications. In an embodiment, the mobile-based terminals can include: phones, tablets, laptops, wearable processing devices, and the like.

Figure 1B:
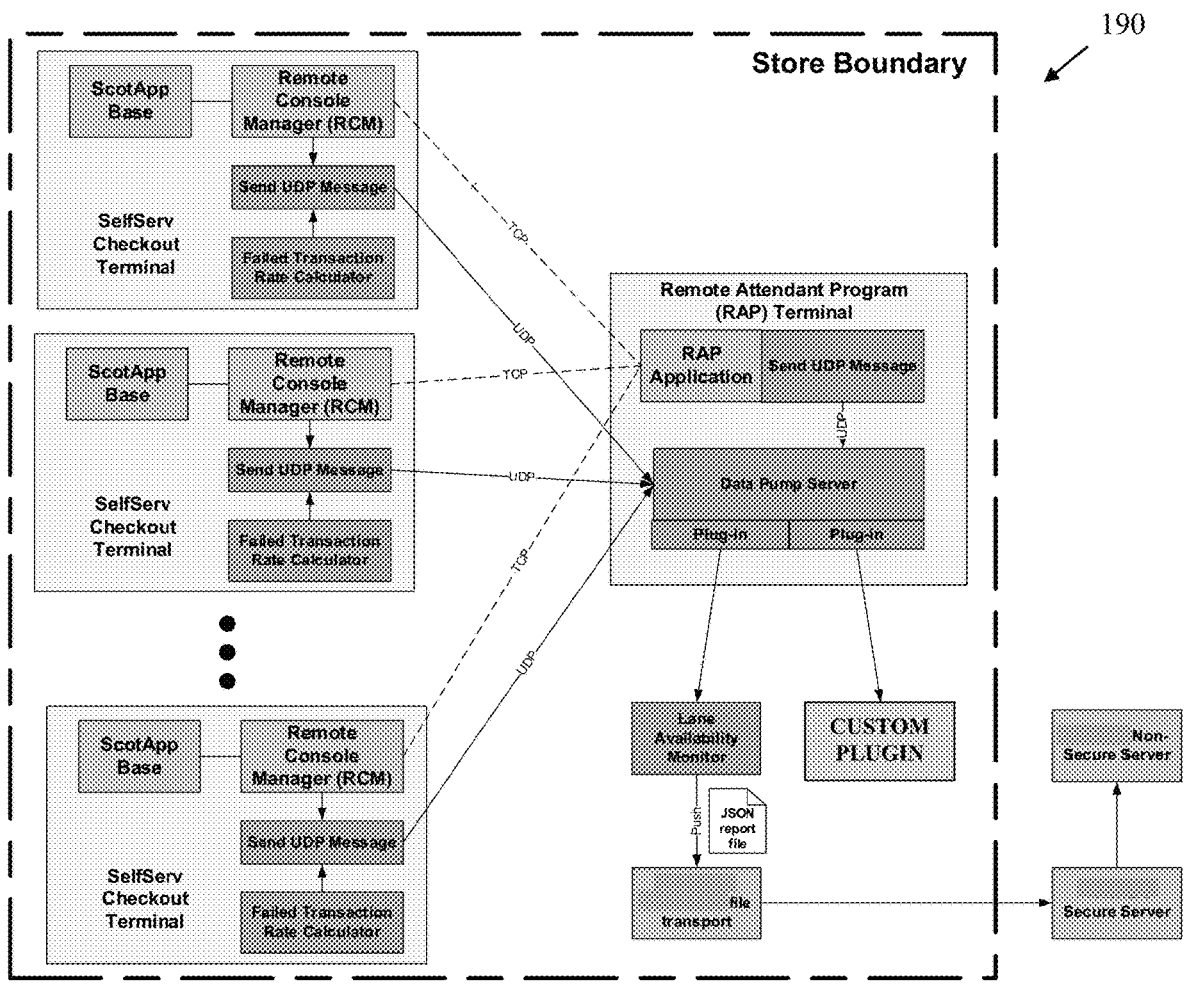
FIG. 1B illustrates another system for custom data aggregation and integration processing, according to an example embodiment.

An example scenario for the system 100 is now presented with reference to the FIG. 1B.

FIG. 1B illustrates another system 190 for custom data aggregation and integration processing, according to an example embodiment.

The system 190 is configured for operation within a LAN environment within a retail store. The system 190 includes a plurality Self Service Checkout (SSCO) terminals (corresponding to the SCO terminals (110, 120, 130, and 140 of the FIG. 1A). Each SSCO terminal having a Self-checkout application base (corresponding to the discussed transaction manager in the FIG. 1A), a Remote Console Manager (RCM and corresponding to the management interfaces (105, 125, 135, and 145) of the FIG. 1A), a User Datagram Protocol (UDP) messaging mechanism, and a failed transaction rate calculator. The system 190 further includes a Remote Attendant Program (RAP) terminal (corresponding to the management terminal 160 of the FIG. 1A). The RAP terminal including a RAP application for receiving the events, metrics, health, intervention, and sales information from the SSCO terminals, a UDP messaging mechanism, and a data pump server application (all of which corresponded to the data manager (165 and 185) from the FIG. 1A).

The SSCO terminals sends real-time status information, workflow information, and transaction count data to the data pump application. The RCMs detects failures, normal versus abnormal restarts for the SSCO terminals by analyzing the logged data at the SSCO terminals. The RCMs sends the data to the data pump application.

The data pump server application listens for real-time data being reported from the SSCO terminals, the data is made available to plugin modules a publish/subscribe model; each plugin being configurable as to specific data types to be routed to it. One such plugin is a dashboard application that subscribes for the real-time terminal availability data. A data pump plugin summarizes the data/counts for each SSCO and RAP terminal and for the SSCO terminals as a whole and exports to the retailer's dashboard system.

Real-time data is fed to the data pump application using UDP, TCP, HTTP, message queueing, or any combination of these data transmission types.

The data pump application is fed by the real-time data of the SSCOs and configured to report the state of health, application state, transaction information, and intervention activity that is fed into plug-in Dynamic Linked Libraries (DLLs) for further consumption by retail-specific applications.

In an embodiment, the data pump application reports key metrics as: availability of SSCOs and RAPs, software component versions, and SSCO failed transaction rates.

In an embodiment, the data pump application produces report files that are pushed to an assigned Intranet host within an enterprise using any file transfer mechanism.

In an embodiment, the data pump application uses a real-time messaging application for reporting in real time the data processed by the data pump application to an enterprise-specific dashboard application.

In an embodiment, the data pump application is fed enterprise's monitoring and security system and hosted by the RAP or by an independent server that is independent of the RAP.

Transaction information and status information passes through the SSCOs to the RAP terminal where the data is fed to the data pump application as messages generated by the RCMs. Each custom plugin of the data pump application develops an aggregation of the data, which then reports the data as it is configured to.

In an embodiment, the status reported for the SSCOs is selected from: out-of-service (not running the appropriate software), full service (able to process transactions and accept card and cash payments), card only (able to process card only transactions), cash only (able to process cash only transactions) lane error (software is running but due to an error is unable to process transactions due to an error state), lane closed (software is running but is unable to process transactions because the lane is closed), and attendant mode (terminal is using an attendant mode of operation).

The systems 100 and 190 provide a seamless integration into existing monitoring and security-based systems for providing customized data aggregation and integration processing within an enterprise. The systems 100 and 190 can be internal to the existing systems or accessed as external-based services over a WAN connection.

In an embodiment, the system 100 utilizes the remote service 180 and the data manager 185 in a cloud processing environment.

These and other embodiments are now discussed with reference to the FIGS. 2-4.

Figure 2:
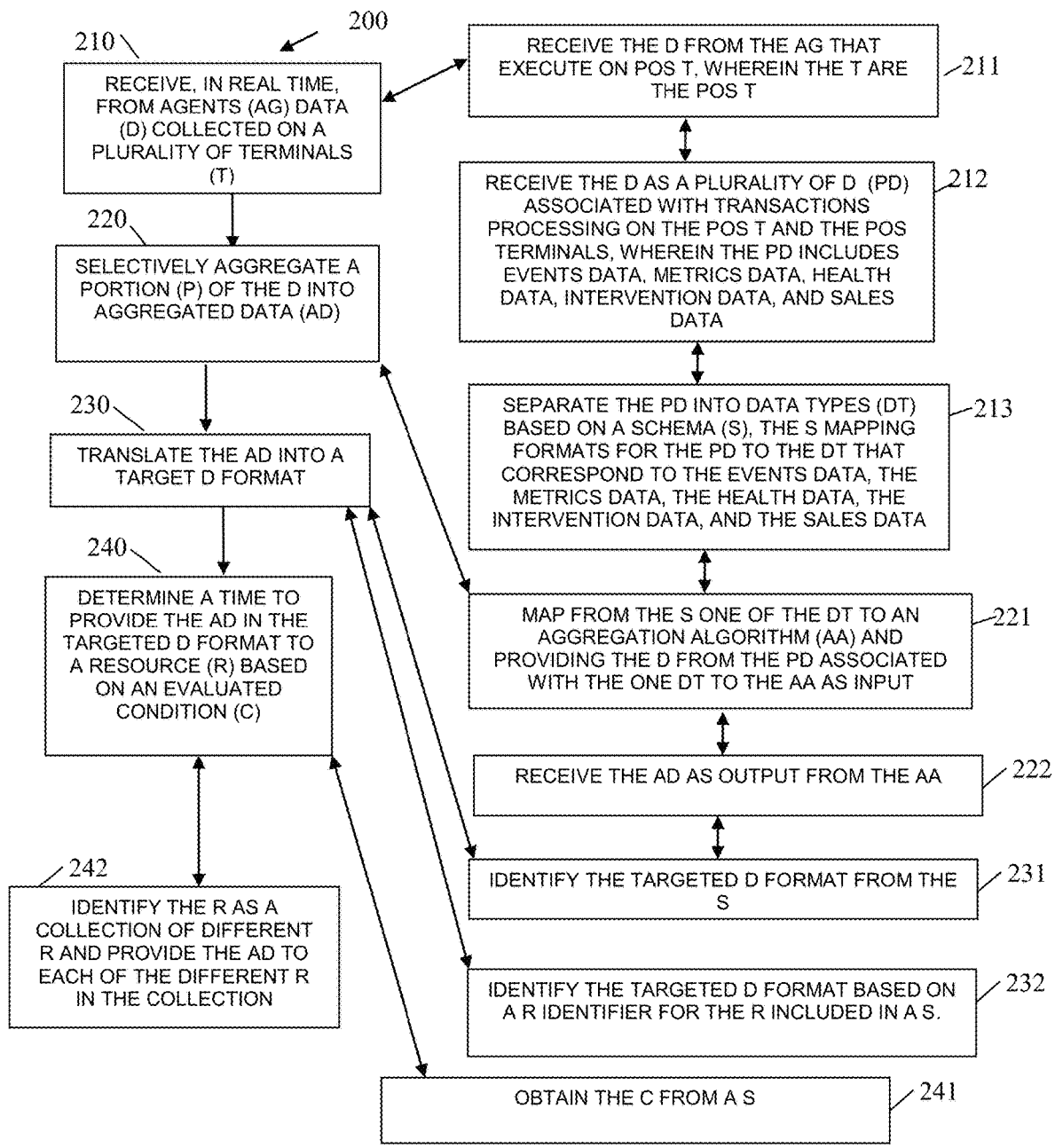
FIG. 2 is a diagram of a method for custom data aggregation and integration processing, according to an example embodiment.

FIG. 2 is a diagram of a method 200 for customized data aggregation and integration processing, according to an example embodiment. The software module(s) that implements the method 200 is referred to as a "data integration manager." The data integration manager is implemented as executable instructions programmed and residing within memory and/or a non-transitory computer-readable (processor-readable) storage medium and executed by one or more processors of a device. The processor(s) of the device that executes the data integration manager are specifically configured and programmed to process the data integration manager. The data integration manager has access to a network during its processing. The network can be wired, wireless, or a combination of wired and wireless.

In an embodiment, the device that executes the data integration manager is the management terminal 160 of the FIG. 1A.

In an embodiment, the device that executes the data integration manager is the remote server 180 of the FIG. 1A.

In an embodiment, the device that executes the data integration manager is the RAP terminal of the FIG. 1B.

In an embodiment, the device that executes the data integration manager is a collection of devices logically organized as a cloud processing environment.

In an embodiment, the data integration manager is the data manager 165.

In an embodiment, the data integration manager is the data manager 185.

In an embodiment, the data integration manager is the data pump server application of the FIG. 1B.

At 210, the data integration manager receives, in real time from agents, data collected on a plurality of terminals. In an embodiment, the terminals include some combination of: a SST, a POS terminal, and a digital sign.

According to an embodiment, at 211, the data integration manager receives the data from the agents that execute on POS terminals; the POS terminal is the terminals.

In an embodiment of 211 and at 212, the data integration manager receives the data as a plurality of data associated with transactions processing on the POS terminals and associated with the POS terminals. The plurality of data includes: events data, metrics data, health data, terminal intervention data, and sales data.

In an embodiment of 212 and at 213, the data integration manager separates the plurality of data into data types based on a schema. The schema maps formats for the plurality of data to the data types that corresponds to the events data, the metrics data, the health data, the terminal intervention data, and the sales data.

At 220, the data integration manager selectively aggregates a portion of the data into aggregated data.

In an embodiment of 213 and 220, at 221, the data integration manager maps from the schema one of the data types to an aggregation algorithm and provides the data from the plurality of data associated with that data type to the aggregation algorithm as input.

In an embodiment of 221, at 222, the data integration manager receives the aggregated data as output from the aggregation algorithm.

At 230, the data integration manager translates the aggregated data into a target data format.

In an embodiment of 222 and 230, at 231, the data integration manager identifies the targeted data format from the schema.

In an embodiment of 230 and at 232, the data integration manager identifies the targeted data format based on a resource identifier for the resource included in a schema.

At 240, the data integration manager determines a time to provide the aggregated data in the targeted data format to a resource based on evaluation of a condition.

In an embodiment, at 241, the data integration manager obtains the condition from a schema.

In an embodiment, at 242, the data integration manager identifies the resource as a collection of different resources and provides the aggregated data to each of the different resources in the collection of resources.

In an embodiment, in addition to the aggregated data, the data or selected portions of the data is provided by the data integration manager to the resource in the targeted data format.

Figure 3:
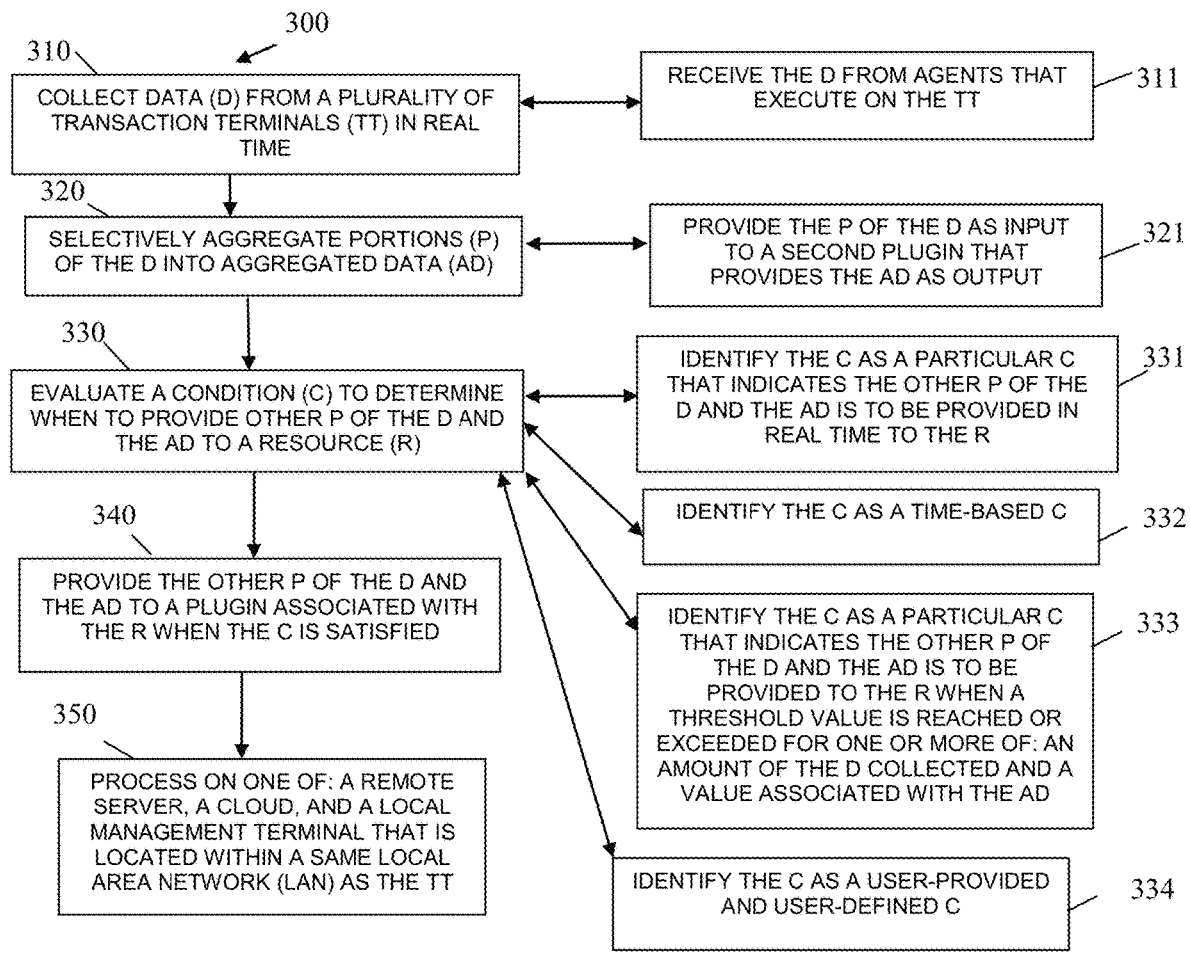
FIG. 3 is a diagram of another method for custom data aggregation and integration processing, according to an example embodiment.

FIG. 3 is a diagram of another method 300 for customized data aggregation and integration processing, according to an example embodiment. The software module(s) that implements the method 300 is referred to as a "data integrator." The data integrator is implemented as executable instructions programmed and residing within memory and/or a non-transitory computer-readable (processor-readable) storage medium and executed by one or more processors of a hardware device. The hardware processors that execute the data integrator are specifically configured and programmed to process data integrator. The data integrator has access to one or more networks during its processing. Each network can be wired, wireless, or a combination of wired and wireless.

In an embodiment, the device that executes the data integrator is the management terminal 160 of the FIG. 1A.

In an embodiment, the device that executes the data integrator is the remote server 180 of the FIG. 1A.

In an embodiment, the device that executes the data integrator is the RAP terminal of the FIG. 1B.

In an embodiment, the device that executes the data integrator is a collection of devices logically organized as a cloud processing environment.

In an embodiment, the data integrator is the data manager 165.

In an embodiment, the data integrator is the data manager 185.

In an embodiment, the data integrator is the data pump server application of the FIG. 1B.

In an embodiment, the data integrator is the method 200.

At 310, the data integrator collects data from a plurality of transaction terminals in real time.

In an embodiment, at 311, the data integrator receives the data from agents that execute on the transaction terminals.

In an embodiment, the transaction terminals are one of: POS terminals, SST terminals, and/or digital signs.

At 320, the data integrator selectively aggregates portions of the data into aggregated data.

In an embodiment, at 321, the data integrator provides the portions of the data as input to a second plugin that provides the aggregated data.

At 330, the data integrator evaluates a condition to determine when to provide other portions of the data and the aggregated data to a resource.

In an embodiment, at 331, the data integrator identifies the condition as a particular condition that indicates the other portions of the data and the aggregated data is to be provided in real time to the resource.

In an embodiment, at 332, the data integrator identifies the condition as a time-based condition.

In an embodiment, at 333, the data integrator identifies the condition as a particular condition that indicates the other portions of the data and the aggregated data is to be provided to the resource when a threshold value is reached or exceeded for one or more of: an amount of data collected and a value associated with the aggregated data.

In an embodiment, at 334, the data integrator identifies the condition as a user-provided and user-defined condition.

At 340, the data integrator provides the other portions of the data and the aggregated data to a plugin associated with the resource when the condition is satisfied.

According to an embodiment, at 350, the data integrator processes on one of: a remote server, a cloud, and a local management terminal that is located within a same LAN as the transaction terminals.

Figure 4:
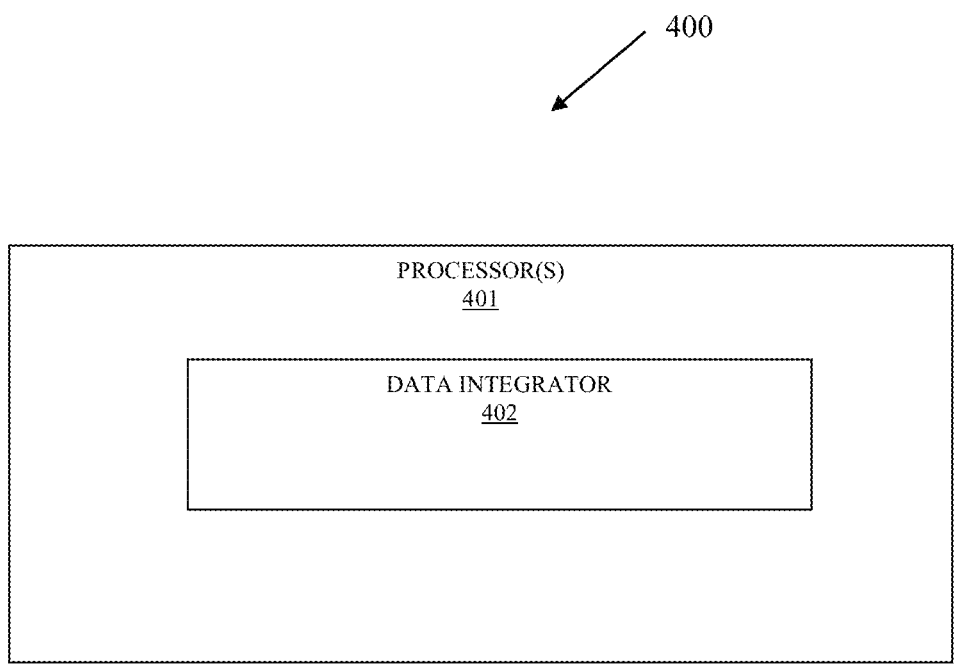
FIG. 4 is a diagram of yet another system for custom data aggregation and integration processing, according to an example embodiment.

FIG. 4 is a diagram of a system for customized data aggregation and integration processing 400, according to an example embodiment. Some components of the system 400 are programmed and reside within memory and/or a non-transitory computer-readable medium and execute on one or more processors of a device or a set of devices. The system 400 communicates over one or more networks, which can be wired, wireless, or a combination of wired and wireless.

In an embodiment, the system 400 is the system 100 of the FIG. 1A.

In an embodiment, the system 400 is the system 190 of the FIG. 1B.

In an embodiment, the system 400 performs and implements all or some combination of the processing discussed above with the FIGS. 1A, 1B, 2, and/or 3.

The system 400 includes at least one hardware processor 401 and a data manager 402.

The data manager 402 is configured to: 1) execute on the processor 401, 2) receive data in real time from a plurality of agents that are executing on a plurality of transaction terminals, 3) selectively aggregate portions of the data as aggregated data, 4) selectively determine a time for reporting the aggregated data and other portions of the data, and 5) provide the aggregated data and the other portions of the data to at least one resource at the time.

In an embodiment, the transaction terminals transaction terminals include one or more combinations of: a digital sign, a Self-Service Terminal (SST), a mobile device having a Self-Service application for performing transactions, and a Point-Of-Sale (POS) terminal. In an embodiment, the mobile device can include: a tablet, a laptop, a phone, and a wearable processing device.

In an embodiment, the data manager 402 is one of, all of, or a combination of: the data manager 165, the data manager 185, the data pump server application of the FIG. 1B, the method 200, and/or the method 300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
receiving, by a processor, terminal data from agents of terminals, each agent activated and executed on a corresponding terminal and each agent registered with a corresponding operating system (OS) of the corresponding terminal to receive event information, wherein the event information at least includes a periodic signal indicating normal operation of the corresponding terminal, wherein the terminal data comprising modes of operation for the terminals, states of the terminals, failures of the terminals, and statuses of the terminals;
wherein the periodic signal is a heartbeat signal for the corresponding terminal;
wherein the modes, states, failures, and statuses comprise software component versions of the terminals, and whether a particular terminal is out-of-service, available for full service, available for card only transactions, available for cash only transactions, a given software component is unable to process a particular transaction, or whether the particular terminal is closed;
selectively, by the processor, aggregating a portion of the terminal data based on specific events identified in the terminal data using a schema that maps formats for data types;
translating, by the processor, the portion into a target data format associated with a resource based on a specific value detected in the portion exceeding a threshold defined in the schema; and
providing, by the processor, the portion in the target data format to the resource based on a specific value detected in the portion.

2. The method of claim 1, wherein receiving further includes separating the terminal data by the data types using the schema.

3. The method of claim 2, wherein selectively aggregating further includes aggregating the portion based on specific data types identified in the terminal data.

4. The method of claim 3, wherein selectively aggregating further includes counting and maintaining metrics for each data type associated with the portion.

5. The method of claim 4, wherein counting and maintaining further includes maintaining separate metrics for each mode of operation associated with the terminals.

6. The method of claim 1, wherein selectively aggregating further includes aggregating the portion based on specific events identified in the terminal data.

7. The method of claim 6, wherein selectively aggregating further includes counting and maintaining metrics for each specific event associated with the portion.

8. The method of claim 1 further comprising, iterating, by the processor, to the receiving for subsequent terminal data received after the providing.

9. The method of claim 1, wherein selectively aggregating further includes generating metrics for the portion based on the data types and events detected in the portion.

10. The method of claim 9, wherein generating further includes generating key metrics from the metrics and maintaining with the portion.

11. The method of claim 10, wherein providing further includes providing the metrics and the key metrics with the portion to the resource.

12. A method, comprising:
deploying, by a processor, agents to terminals, each agent activated and executed on a corresponding terminal and each agent registered with a corresponding operating system (OS) of the corresponding terminal to receive event information, wherein the event information at least includes a periodic signal indicating normal operation of the corresponding terminal;
receiving, by the processor, metrics collected by the agents and a data pump application, the metrics comprising heartbeat signals of the terminals, software component versions of the terminals, and whether a particular terminal is out-of-service, available for full service, available for card only transactions, available for cash only transactions, a given software component is unable to process a particular transaction, or whether the particular terminal is closed;

aggregating, by the processor, the metrics based on specific events identified in terminal data using a schema that maps format for a plurality of data to data types; and providing, by the processor, aggregated metrics associated with the aggregating to a resource based on a certain value for a certain metric exceeding a threshold in the aggregated metrics, wherein the resource is identified from the schema associated with the metrics, wherein providing further includes translating the aggregated metrics into a target data format associated with the resource, wherein the threshold is defined in the schema.

13. The method of claim 12, wherein deploying further includes configuring each of the agents with the schema for identifying the data types and events on the corresponding terminal and generating the corresponding metrics for the corresponding terminal.

14. The method of claim 12, wherein providing further includes identifying the resource from a schema associated with the aggregated metrics.

15. The method of claim 12, wherein providing further includes changing a timing associated with the providing based a second certain value associated with a second certain metric.

16. The method of claim 12, wherein providing further includes providing the aggregated metrics to a plurality of second resources.

17. The method of claim 13, wherein providing further includes providing a portion of the aggregated metrics to the resource and the second resources.

18. A system, comprising:
   a server that comprises a processor; and
   the processor executes instructions that cause the processor to perform operations comprising:
   configuring agents to collect metrics from terminals using on a schema that defines data types and event types, wherein the metrics comprising usage events and error events for terminal data available on the terminals;
   wherein the metrics comprise a heartbeat signal for a corresponding terminal;
   wherein the usage events and error events comprise software component versions of the terminals, and whether a particular terminal is out-of-service, available for full service, available for card only transactions, available for cash only transactions, a given software component is unable to process a particular transaction, or whether the particular terminal is closed;
   deploying each agent to a corresponding terminal each agent activated and executed on the corresponding terminal and each agent registered with a corresponding operating system (OS) of the corresponding terminal to receive event information, wherein the event information at least includes a periodic signal indicating normal operation of the corresponding terminal;
   receiving the metrics from the agents for the terminals based on the corresponding terminal data available on the corresponding terminals, wherein the metrics are aggregated based on specific events identified in the terminal data using the schema that maps data formats to the data types, wherein receiving further includes selectively aggregating into aggregated metrics; and
   providing the aggregated metrics to at least one resource defined in the schema based on a specific value for a certain metric exceeding a threshold defined in the schema, wherein providing further includes translating the aggregated metrics into a target data format associated with the resource, wherein the threshold is defined in the schema.

19. The system of claim 18, wherein the terminals comprising self-service terminals and point-of-sale terminals.

\* \* \* \* \*